United States Patent [19]

Gjestrum et al.

[11] Patent Number: 4,748,599

[45] Date of Patent: May 31, 1988

[54] CONTROL DEVICE FOR CABLES WITH SEISMIC EQUIPMENT, ESPECIALLY FOR GUN CABLES COMPRISING ONE OR SEVERAL GUN ARRAYS

[75] Inventors: Einar Gjestrum, Oslo; Ian Rogers, Sandvika, both of Norway

[73] Assignee: Geco A.S., Kjorbokollen N-1301, Sandvika, Norway

[21] Appl. No.: 943,096

[22] Filed: Dec. 18, 1986

[30] Foreign Application Priority Data

Dec. 18, 1985 [NO] Norway ............................ 855143

[51] Int. Cl.$^4$ .......................... G01V 1/38; B63H 25/00
[52] U.S. Cl. ...................................... 367/17; 114/246
[58] Field of Search .................................. 367/16–18, 367/144.15; 114/242, 244, 245, 246, 283; 181/110, 111, 112, 118

[56] References Cited

U.S. PATENT DOCUMENTS

| | | | |
|---|---|---|---|
| 2,652,550 | 9/1953 | Lash | 367/16 |
| 2,774,955 | 12/1956 | Toomey | 367/16 |
| 3,331,050 | 7/1967 | Kilmer et al. | 367/23 |
| 3,531,761 | 9/1970 | Tickell et al. | 367/17 |
| 3,531,762 | 9/1970 | Tickell | 367/17 |
| 3,658,149 | 4/1972 | Neal et al. | 181/118 |
| 4,130,078 | 12/1978 | Cholet | 114/224 |
| 4,323,989 | 4/1982 | Huckabee et al. | 367/17 |
| 4,506,352 | 3/1985 | Brandsaeter et al. | 367/21 |

*Primary Examiner*—Thomas H. Tarcza
*Assistant Examiner*—Ian J. Lobo
*Attorney, Agent, or Firm*—Holman & Stern

[57] ABSTRACT

A device for controlling a seismic cable that is towed behind a vessel (1), so that the cable follows a path that is displaced laterally in relation to the path of the vessel, comprises a frame structure (6, 7) extending transversely to the towing direction and outwardly from the area of gun suspension from the cable having longitudinal frame members provided with intermediate transverse members extending obliquely or in a curved manner whereby the front ends of the transverse members, as seen in the towing direction, are disposed further outwards laterally than the rear ends of the transverse members. When towed, the frame will this be forced outwardly by the water flowing through the frame structure and the desired lateral displacement will be achieved.

9 Claims, 2 Drawing Sheets

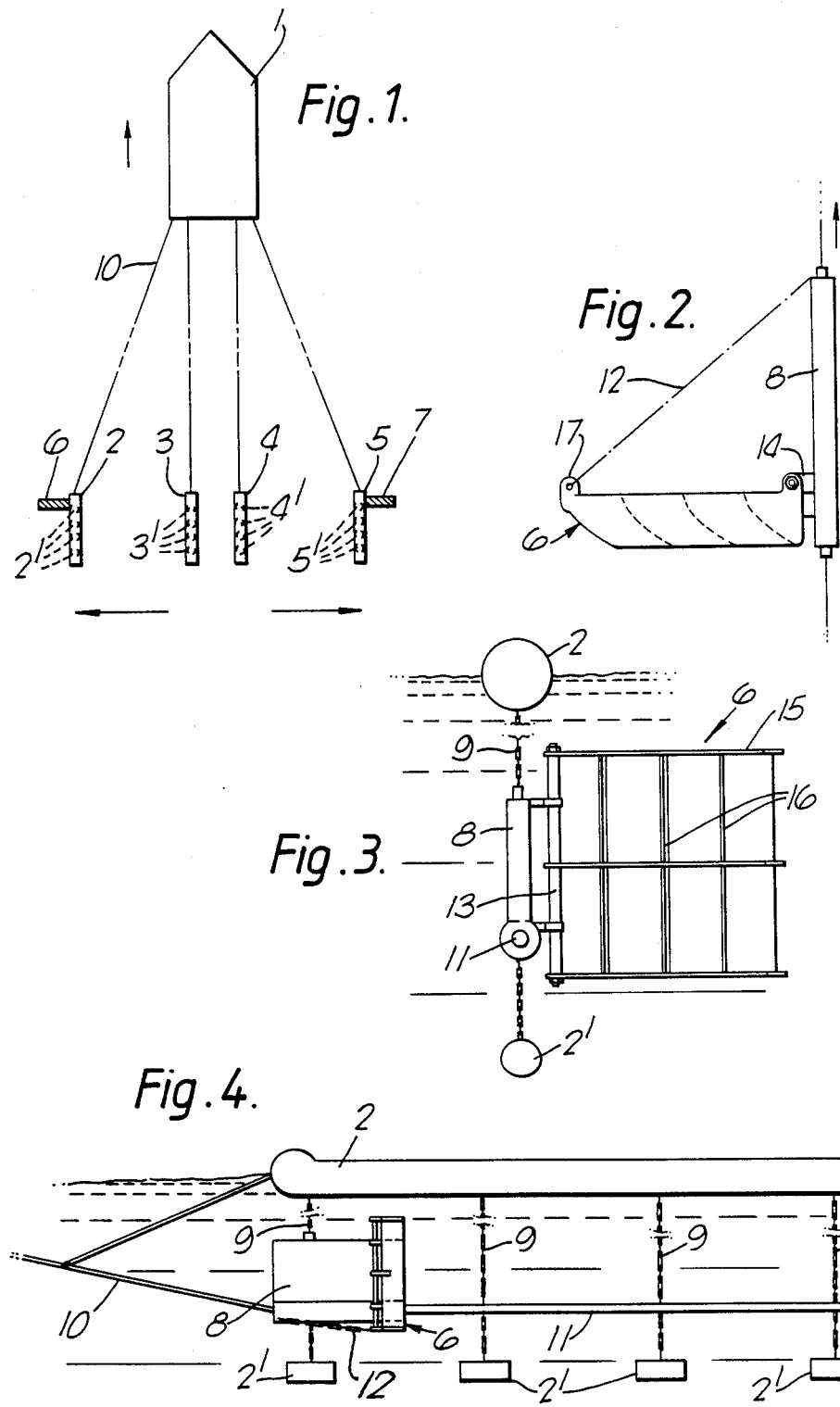

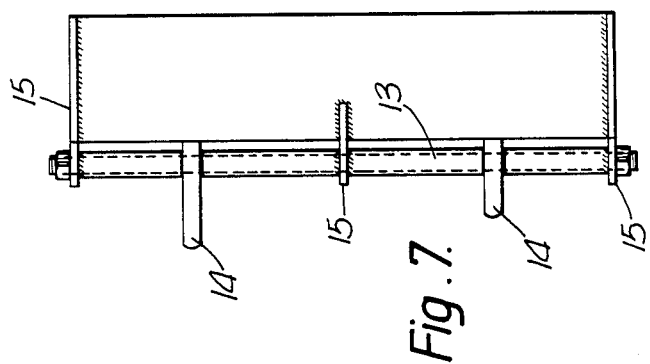
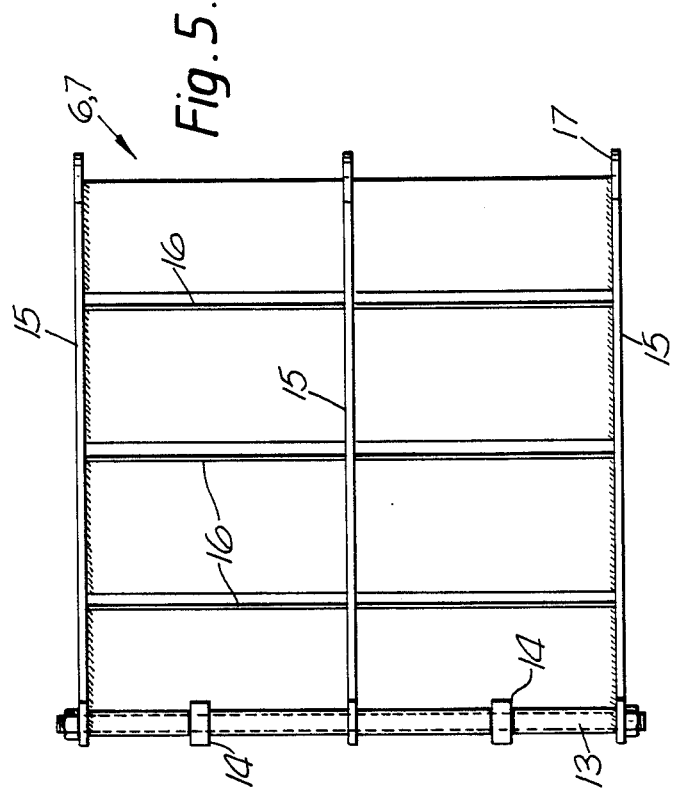
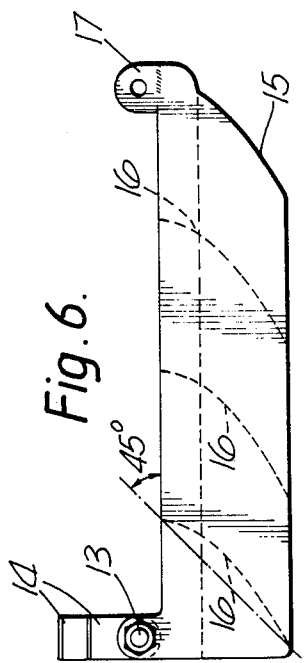

CONTROL DEVICE FOR CABLES WITH SEISMIC EQUIPMENT, ESPECIALLY FOR GUN CABLES COMPRISING ONE OR SEVERAL GUN ARRAYS

BACKGROUND OF THE INVENTION

1. Field of the Invention

The present invention relates to a control device for cables with seismic equipment, especially for seismic gun cables provided with one or several arrays of guns which are towed behind a vessel. The term gun cable in this context covers both a cable and one or more gun arrays. The invention especially relates to a control device for maintaining a gun cable in a course of travel that is laterally displaced in relation to the course of travel of the vessel towing the cable in the sea.

2. Description of the Prior Art

In seismic exploration at sea seismic gun cables, i.e. cables comprising pulse emitting "guns" suspended beneath buoyancy members, are towed in the water behind a vessel. From the guns pulses are fired, the reflections of which from the sea bottom are detected by the aid of a receiver cable, or streamer, that is also towed behind the vessel.

There are a number of different principles for designing such towing systems for seismic exploration in order to achieve the best possible results based on local conditions and geological formations. In this connection it may, inter alia, be desirable to tow several cables side by side in a parallel formation with defined interspaces. Such a method for several parallel gun cables is, e.g. disclosed in Norwegian Pat. No. 147.655 (Application No. 80 3400), which corresponds to U.S. Pat. No. 4,506,352. In the method disclosed in that reference otter boards and paravanes (float bodies) are used to space the cables mutually. With this method a comparatively wide distribution of cables may be achieved, e.g. a distance of 150 m between the outermost cables. It has also been suggested to use floats with rudder control to keep cables at a mutual distance, but float arrangements of this kind will be dependent on both weather and wind, and it is a question how efficient they would really be.

In case of the method disclosed in the above mentioned patent a smaller distance between gun cables laterally may be sufficient for special conditions or geological formations. This may also be the case when smaller areas and narrow or shallow waters are to be explored, and a simplified equipment for keeping said cables at a mutual lateral distance will obviously, be advantageous in such cases. There is, thus a demand for a simple device to be used for carrying out the method according to the above mentioned patent in a limited or smaller area.

BRIEF SUMMARY OF THE INVENTION

It is an object of the present invention to provide a device for laterally displacing seismic gun cables towed behind a vessel at sea. It is a further object of the invention to provide a device for controlling the path of a cable that is towed behind a vessel so that the cable follows a path that is displaced laterally in relation to the path of the vessel.

These objects are achieved by the device of the invention that is characterized by a frame structure extending from the cable transversely to the towing direction, preferably on the remote side of the cable from the path of the vessel having longitudinal first frame members provided with intermediate transverse second members extending obliquely or in a curved manner.

The device may be secured to the line or wire between the air guns and the buoyancy member supporting the air guns and preferably is placed in the area where the towing cable is secured and where the operation cables for the guns are extended. The frame is constructed and arranged so that when towed, the frame will be forced outwardly by the water reacting on the second members and the desired lateral displacement will be achieved due to the front ends of the transverse members, as seen in the towing direction, being disposed further laterally outwardly of the path of the vessel than the rear ends of the transverse members. A distance up to 50 m may be kept between the two outermost gun cables. In a towing system comprising several subarrays of guns arranged behind one another, one such device may be provided for each subarray.

BRIEF DESCRIPTION OF THE DRAWINGS

The invention will now be described in more detail with reference to an embodiment shown in the accompanying drawing, wherein:

FIG. 1 is a schematic top plan view of a seismic vessel with a towing system using the device according to the present invention;

FIG. 2 is a top plan view showing details of the principle for mounting the device according to the invention;

FIG. 3 is a front elevational view of the device as shown in FIG. 4;

FIG. 4 is a side elevational schematic view illustrating the arrangement of the device of FIGS. 2 and 3 beneath a buoyancy member;

FIG. 5 is an enlarged side elevational view similar to FIG. 3 showing only one part of the device in greater detail;

FIG. 6 is a bottom plan view of FIG. 5; and

FIG. 7 is a right side elevational view of FIG. 5.

The figures are diagrammatically drawn and are only intended as illustrations of the principles for mounting the device and of a possible design thereof.

DETAILED DESCRIPTION

FIG. 1 shows a seismic vessel 1 towing several gun cables 10 side by side, the distance between the two outermost cables at their outer ends being, for example approximately 50 m. At the end of each cable buoyancy members 2, 3, 4 and 5 are diagrammatically shown. Groups or arrays of air guns 2', 3', 4', 5' are suspended from said buoyancy members and are intended for emitting mutually coordinated seismic pulses. The reflections of said pulses are detected by the aid of a receiver cable or streamer, not shown. Each of the outermost cables are provided with a device according to the invention, in the shown embodiment arranged on the outside, i.e. extending laterally outwardly. Said devices are designated 6 on the port side and 7 on the starboard side and are the same structurally but mirror images of each other. In longer towing systems several arrays of air guns may be provided behind each other. It is, then advantageous to provide each subarray with a control device. The buoyancy members and the suspension of the guns may be of a type disclosed in the above-referred-to patent. The design of these structural members is, thus not disclosed in detail here.

The device 6 or 7 which is to hold the buoyancy member and, thus, the guns in the laterally displaced path while they are towed in the direction indicated by arrows in the Figures, is suspended on a securing member 8 that is connected on line or cable 9 between the buoyancy member 2 and guns 2' in the area where the towing line 10 is secured and where cable 11 for the drive means for the guns are located. Securing member 8 is a plate shaped member disposed vertically in the water and extending in parallel with the towing direction. On securing member 8 the device according to the invention is mounted so as to project laterally across the towing direction. In order to keep it in that position a wire, cable, chain, or a steel brace 12 is extended from the extreme edge of the device to a point in the front portion of securing member 8 as will appear from FIGS. 1-4.

FIGS. 5-7 show the device of the invention in greater detail. A suspending tube 13 forms the connection to securing member 8 and has lugs 14 thereon for this purpose. The device comprises a frame of steel or aluminum, in the shown embodiment shown provided with three longitudinal frame members 15 which are plate-shaped, as shown in FIG. 6. Between the frame members 15 transverse members 16 are mounted so as to extend obliquely, as shown in FIG. 6, preferably at an angle of 45°. Transverse members 16, advantageously, have a curved shape. Longitudinal frame members 15 have lugs 17 at the ends for securing at tube 13 and the cable or brace 12 to keep the device at a correct angle in relation to the towing direction.

When this device is towed, water will flow through frame 6, 7 between members 15, 16, and against angular or curved transverse members 16. This will cause the frame and, thus the gun cable to be forced laterally outwardly, and the desired lateral distance relative to the adjacent cable will, thus be maintained.

There are, obviously, many possible modifications within the scope of the invention. The securing method may be modified as well as the shape of the frame. The essential fact is that a structure is provided with members that provide a water pressure during towing which will urge the gun cable outwards laterally.

We claim:

1. In a device for controlling the position of a marine seismic gun towed behind a vessel at sea including a buoyant member towed by a towing cable and an air gun suspended by a connecting line from the buoyant member, the improvement comprising:
   a securing member attached to said connecting line;
   suspending tube means;
   lug means connecting said suspending tube means to said securing member;
   a frame structure connected to said suspending tube means and extending in a direction transverse to the towing direction of the towing cable and laterally outwardly with respect to said securing member comprising,
   longitudinal frame members extending in said transverse direction,
   intermediate transverse members disposed intermediately of said longitudinal members and each having a forward end and a rear end, said forward end being laterally outwardly with respect to said securing member farther than said rear end so that said transverse members extend in a direction substantially oblique to the direction of travel of said frame structure; and
   means for connecting said frame structure to said suspending tube means so that when said buoyant member and air gun are towed through the water said frame member controls said buoyant member and air gun to travel in a path laterally displaced outwardly with respect to the path of travel of the towing vessel.

2. A device as claimed in claim 1 wherein said securing member comprises:
   a plate-shaped member extending vertically and having a longitudinal dimension extending in the towing direction.

3. A device as claimed in claim 1 wherein:
   said transverse members are curved.

4. A device as claimed in claim 2 wherein:
   said transverse members are curved.

5. A device as claimed in claim 1 and further comprising:
   at least one lug element on the laterally outer portion of said frame structure; and
   connecting means between said at least one laterally outer end lug element and a position on said securing member forward of said frame structure for maintaining said frame structure in a desired extending position relative to said securing member.

6. A device as claimed in claim 4 and further comprising:
   at least one lug element on the laterally outer portion of said frame structure; and
   connecting means between said at least one laterally outer end lug element and a position on said securing member forward of said frame structure for maintaining said frame structure in a desired extending position relative to said securing member.

7. A device as claimed in claim 1 and further comprising:
   at least one lug element on the laterally outer portion of said frame structure; and
   connecting means between said at least one laterally outer end lug element and a position on said towing line forward of said frame structure for maintaining said frame structure in a desired extending position relative to said securing member.

8. A device as claimed in claim 1 wherein:
   said transverse members extend at an angle of 45° relative to the laterally extending longitudinal members.

9. A device as claimed in claim 6 wherein:
   said transverse members extend at an angle of 45° relative to the laterally extending longitudinal members.

* * * * *